(12) United States Patent
Zhou et al.

(10) Patent No.: US 12,400,288 B2
(45) Date of Patent: Aug. 26, 2025

(54) PHOTOGRAPHING METHOD, AND ELECTRONIC DEVICE AND NON-TRANSITORY READABLE STORAGE MEDIUM

(71) Applicant: VIVO MOBILE COMMUNICATION CO., LTD., Guangdong (CN)

(72) Inventors: Xudong Zhou, Dongguan (CN); Shuyang Wei, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 206 days.

(21) Appl. No.: 18/142,785

(22) Filed: May 3, 2023

(65) Prior Publication Data

US 2023/0274388 A1    Aug. 31, 2023

Related U.S. Application Data

(63) Continuation of application No. PCT/CN2021/128335, filed on Nov. 3, 2021.

(30) Foreign Application Priority Data

Nov. 4, 2020 (CN) .......................... 202011216613.0

(51) Int. Cl.
G06T 3/40 (2024.01)
G06T 11/00 (2006.01)

(52) U.S. Cl.
CPC ................ G06T 3/40 (2013.01); G06T 11/00 (2013.01); *G06T 2210/36* (2013.01)

(58) Field of Classification Search
CPC ....... G06T 11/00; G06T 2210/36; G06T 3/40; H04N 23/951; H04N 23/631; H04N 5/272; G06F 3/048; G06F 3/0481; G06F 3/0487
See application file for complete search history.

(56) References Cited

U.S. PATENT DOCUMENTS

| | | | |
|---|---|---|---|
| 7,505,074 B2 * | 3/2009 | Yoshino ............... | H04N 23/634 345/667 |
| 9,124,785 B2 * | 9/2015 | Choi ..................... | H04N 23/667 |
| 9,232,125 B2 | 1/2016 | Song | |
| 9,325,903 B2 * | 4/2016 | Kim ..................... | H04N 23/631 |

(Continued)

FOREIGN PATENT DOCUMENTS

| | | |
|---|---|---|
| CN | 1652573 A | 8/2005 |
| CN | 102546925 A | 7/2012 |

(Continued)

*Primary Examiner* — Kee M Tung
*Assistant Examiner* — Nauman U Ahmad
(74) *Attorney, Agent, or Firm* — The Webb Law Firm

(57) ABSTRACT

A photographing method includes: receiving a photographing input on a target object; in response to the photographing input, generating a first image within a period from a time when receiving the photographing input to a first time and generating a second image within a period from the time when receiving the photographing input to a second time; and in a case that a second input by a user is received before the second time, displaying the first image in response to the second input, and displaying the second image after the second time. Pixels of the first image are fewer than pixels of the second image; and the second time is greater than the first time.

12 Claims, 7 Drawing Sheets

(56) References Cited

U.S. PATENT DOCUMENTS

| | | | |
|---|---|---|---|
| 2006/0170769 A1* | 8/2006 | Zhou | G06V 20/52 |
| | | | 382/103 |
| 2012/0147220 A1 | 6/2012 | Lee | |
| 2012/0290930 A1 | 11/2012 | Bhatt et al. | |
| 2014/0063314 A1 | 3/2014 | Sankaranarayanan et al. | |
| 2016/0301861 A1 | 10/2016 | Miao | |
| 2020/0304751 A1 | 9/2020 | Katoh et al. | |
| 2020/0357142 A1* | 11/2020 | Aydin | H04N 5/275 |
| 2022/0100030 A1* | 3/2022 | Dong | G02B 27/286 |

FOREIGN PATENT DOCUMENTS

| | | |
|---|---|---|
| CN | 103139473 A | 6/2013 |
| CN | 103561205 A | 2/2014 |
| CN | 105975046 A | 9/2016 |
| CN | 108495041 A | 9/2018 |
| CN | 109510940 A | 3/2019 |
| CN | 109688321 A | 4/2019 |
| CN | 112383708 A | 2/2021 |

\* cited by examiner

The photographing apparatus generates an image of a foreground region of the second image within the second time, and generates an image of a background region of the second image after the image of the foreground region is generated. — 202a The photographing apparatus replaces the displayed first image with the second image after the second time ~ 203a

FIG. 9

In a case that a third input is received after the second time, the photographing apparatus displays the second image in response to the third input. ~ 204

FIG. 10

The photographing apparatus determines a target region in response to a fourth input by the user on the first image ~ 205a1

The photographing apparatus generates a first target sub-image based on the target region. ~ 205a2

The photographing apparatus generates and displays a third image based on the first image and the first target sub-image. ~ 205a3

FIG. 11

PHOTOGRAPHING METHOD, AND ELECTRONIC DEVICE AND NON-TRANSITORY READABLE STORAGE MEDIUM

CROSS-REFERENCE TO RELATED APPLICATIONS

This application is a Bypass Continuation Application of PCT/CN2021/128335 filed on Nov. 3, 2021, which claims priority to Chinese Patent Application No. 202011216613.0 filed on Nov. 4, 2020, which are incorporated herein by reference in their entirety.

TECHNICAL FIELD

Embodiments of this application relate to the field of communication technologies, and in particular, to a photographing method, an electronic device, and a non-transitory readable storage medium.

BACKGROUND

With the increasing demand of consumers for photographing functions of electronic devices such as mobile phones, increasing pixels of photos taken has become a common goal of major manufacturers.

SUMMARY

According to a first aspect, an embodiment of this application provides a photographing method. The method includes: receiving a photographing input on a target object; in response to the photographing input, generating a first image within a period from a time when receiving the photographing input to a first time and generating a second image within a period from the time when receiving the photographing input to a second time; and in a case that a second input by a user is received before the second time, displaying the first image in response to the second input, and displaying the second image after the second time. Pixels of the first image are fewer than pixels of the second image; and the second time is greater than the first time.

According to a second aspect, an embodiment of this application further provides a photographing apparatus. The apparatus includes: a receiving module, a generating module, and a display module. The receiving module is configured to receive a photographing input on a target object. The generating module is configured to: in response to the photographing input received by the receiving module, generate a first image within a period from a time when receiving the photographing input to a first time and generate a second image within a period from the time when receiving the photographing input to a second time. The display module is configured to: display the first image in response to a second input by a user received by the receiving module before the second time, and display the second image after the second time. Pixels of the first image are fewer than pixels of the second image; and the second time is greater than the first time.

According to a third aspect, an embodiment of this application provides an electronic device, including a processor, a memory, and a program or instructions that are stored in the memory and executable on the processor, wherein when the program or instructions are executed by the processor, steps of the photographing method according to the first aspect are implemented.

According to a fourth aspect, an embodiment of this application provides a non-transitory readable storage medium, storing a program or instructions, wherein when the program or instructions are executed by a processor, steps of the method according to the first aspect are implemented.

According to a fifth aspect, an embodiment of this application provides a chip, including a processor and a communication interface, where the communication interface is coupled to the processor, and the processor is configured to execute a program or instructions to implement the method according to the first aspect.

According to a sixth aspect, an embodiment of this application further provides a computer program product, stored in a non-volatile storage medium, and configured to be executed by at least one processor to implement steps of the method above.

According to a seventh aspect, an embodiment of this application further provides a control apparatus, configured to perform the method above.

BRIEF DESCRIPTION OF THE DRAWINGS

FIG. 9 is a schematic flowchart 3 of a photographing method according to an embodiment of this application;

FIG. 10 is a schematic flowchart 4 of a photographing method according to an embodiment of this application; and FIG. 11 is a schematic flowchart 5 of a photographing method according to an embodiment of this application.

DETAILED DESCRIPTION

The following clearly describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application shall fall within the protection scope of this application.

In the specification and claims of this application, the terms "first", "second", and the like are intended to distinguish between similar objects but do not indicate a particular order or sequence. It should be understood that the data termed in such a way is interchangeable in proper circumstances, so that the embodiments of this application can be implemented in other orders than the order illustrated or described herein. In addition, the objects distinguished by "first" and "second" are usually of the same type, and a quantity of the objects is not limited. For example, there may be one or more first objects. Moreover, "and/or" used in this specification and the claims represents at least one of the connected objects, and the character "/" generally indicates an "or" relationship between the associated objects.

The photographing method provided in the embodiments of this application may be applied in a scenario in which a user takes photos by using an electronic device.

Currently, to increase pixels of photos taken and increase resolution of photos taken, a user usually takes photos by using an electronic device with a camera with tens of millions of pixels or even hundreds of millions of pixels.

However, because high-resolution photos contain a huge amount of information and are limited by a processing speed of a CPU in the electronic device, appearance of the photos is slow. After pressing a shutter button, if the user wants to immediately preview a taken photo, the user often needs to wait for 2-5 seconds for processing. This is difficult to satisfy the photographing experience "shoot and get" of the user.

Figure 1:
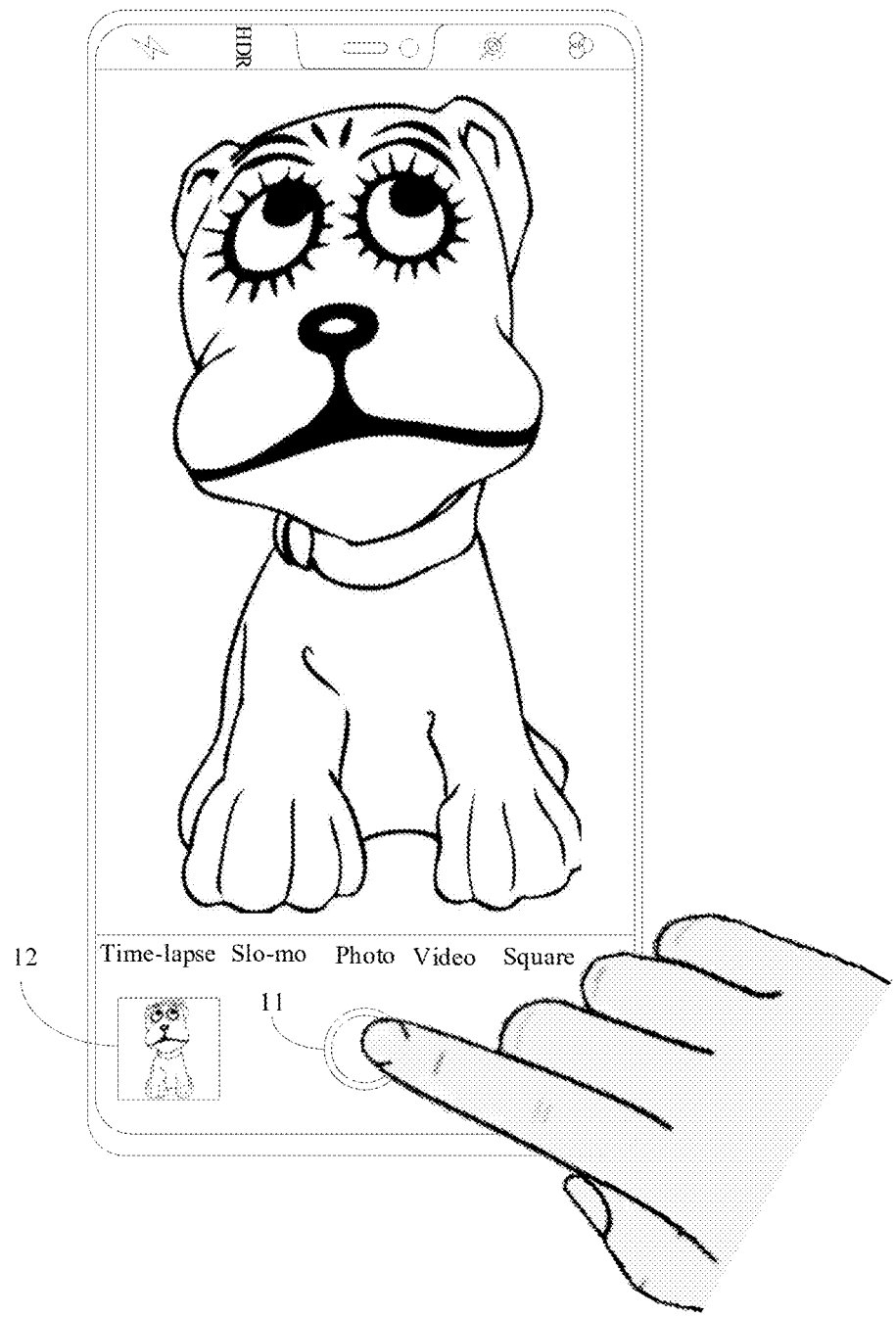
FIG. 1 is a schematic diagram of a photographing interface according to an embodiment of this application.

For example, a user takes photos by using a mobile phone. FIG. 1 shows a photographing interface of the mobile phone. In the related art, in order to take clearer photos, major manufacturers use ultra-high-resolution cameras. After the user focuses the mobile phone on an object and taps a shutter button 11 of the mobile phone, photographing is completed on the mobile phone, and the user can preview an image obtained through photographing by tapping a preview region 12. However, due to increase of pixels of the camera, the photo can only appear on the electronic device after 2-5 seconds after photographing. Before the photo appears, the user cannot preview the photo taken by tapping the preview region 12, which affects the photographing experience of the user.

To resolve this problem, in the technical solutions provided in the embodiments of this application, after receiving a photographing input by a user, a mobile phone generates a first image with a lower resolution within a period from a photographing time to a first time and generates a second image with a higher resolution within a period from the photographing time to a second time. Then, if receiving a second input by the user before the second time, the mobile phone first displays the first image with the lower resolution, and then replaces the displayed first image with the second image after the second time. If a third input by the user is received after the second time, the second image is directly displayed. In this way, the user can preview the image obtained through photographing within a short time after the photographing by using the mobile phone.

The following describes the photographing method provided in the embodiments of this application in detail through specific embodiments and application scenarios thereof with reference to the accompanying drawings.

Figure 2:
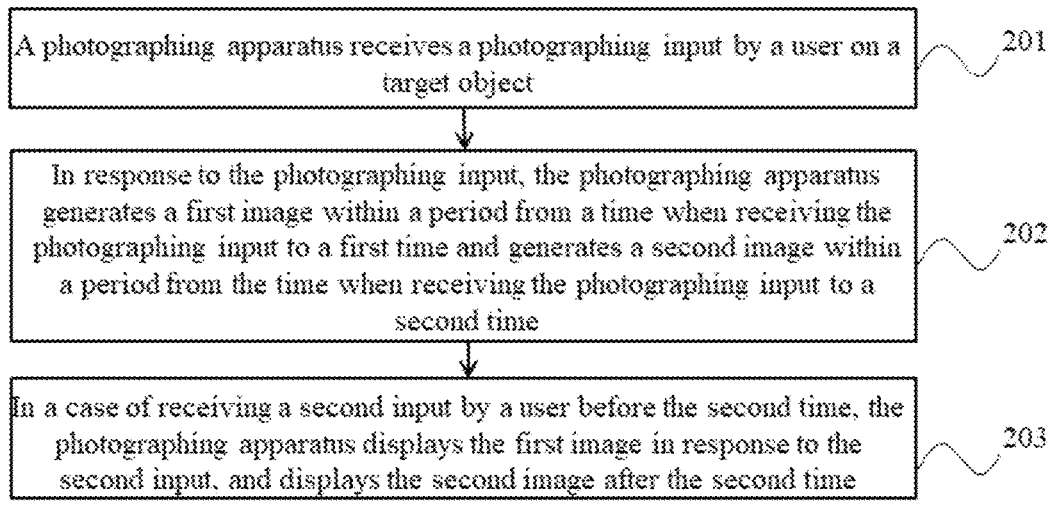
FIG. 2 is a schematic flowchart 1 of a photographing method according to an embodiment of this application.

As shown in FIG. 2, an embodiment of this application provides a photographing method. The method may include the following steps 201 to 203.

Step 201. A photographing apparatus receives a photographing input by a user on a target object.

For example, the photographing input may be an input by the user on a screen of an electronic device, or a voice instruction inputted by the user, or a specific gesture inputted by the user, and may be specifically determined according to an actual use requirement. This is not limited in the embodiments of the present invention. For example, the photographing input may be an input by the user tapping a shutter button on a photographing interface of the electronic device or an input by the user controlling the electronic device to perform photographing through a voice instruction. The target object is an object to be photographed by the user.

Step 202. In response to the photographing input, the photographing apparatus generates a first image within a period from a time when receiving the photographing input to a first time and generates a second image within a period from the time when receiving the photographing input to a second time.

It may be understood that, after receiving the photographing input by the user on the target object, the photographing apparatus performs photographing at T0, and the photographing apparatus generates the first image at T1 and generates the second image at T2. The three times are in the following relationships: T0<T1<T2. For example, the photographing apparatus photographs the target object at T0, generates the first image within 0.5 seconds, and generates the second image within 2.5 seconds.

It is to be noted that, the first image is generated within a relatively short time. Therefore, times at which the first image and the second image start to be generated may or may not be the same, and both fall within the protection scope of this application.

Step 203. In a case of receiving a second input by the user before the second time, the photographing apparatus displays the first image in response to the second input, and displays the second image after the second time.

Pixels of the first image are fewer than pixels of the second image; and the second time is greater than the first time.

For example, the second input may be an input by the user previewing the second image. For example, as shown in FIG. 1, the second input may be an input by the user tapping the preview region 12, or may be an input by the user opening a photos application to preview the second image obtained through photographing.

For example, generally, the photographing apparatus takes a short time to generate the first image and takes a long time to generate the second image. When the user wants to immediately preview the image obtained through photographing after the photographing input is completed, but the high-resolution second image to be previewed by the user has not been generated at this time, the photographing apparatus may display, to the user, the low-resolution first image that has been generated, and then display the high-resolution second image to the user after the second image is generated.

For example, after the second image is generated, the photographing apparatus may delete the first image and replace the first image with the second image.

Figure 3A:
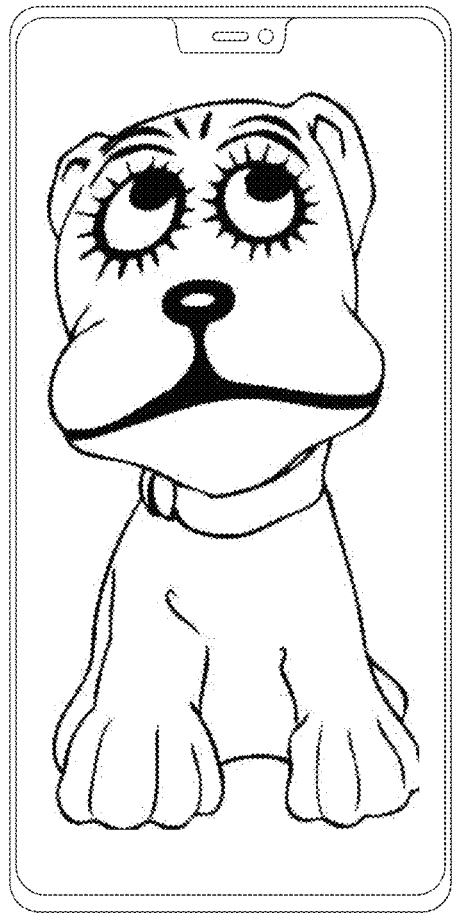
FIG. 3A is a schematic diagram 1 of an interface to which a photographing method is applied according to an embodiment of this application.
Figure 3B:
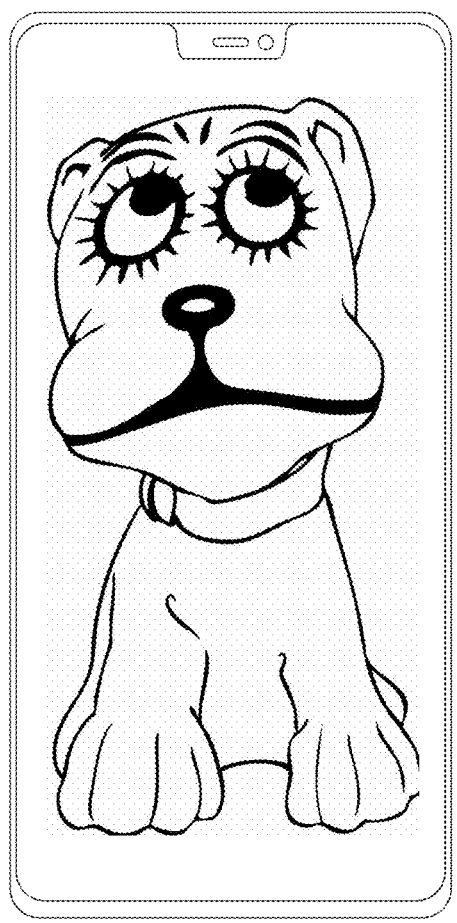
FIG. 3B is a schematic diagram 3 of an interface to which a photographing method is applied according to an embodiment of this application.

For example, with reference to FIG. 1, as shown in FIG. 3A and FIG. 3B, FIG. 3A shows an interface of the low-resolution first image displayed by the electronic device, and FIG. 3B shows an interface of the high-resolution second image displayed by the electronic device. Before generating the second image and after receiving the second input by the user, the electronic device displays the low-resolution first image, and replaces the first image with the high-resolution second image in an image preview interface after generating the second image.

In this case, after receiving the photographing input by the user, the electronic device generates the first image with a lower resolution and the second image with a higher resolution. Then, if the second input by the user is received before the second image is generated, the first image is displayed to the user first, and then the second image is displayed to the user after the second image is generated. In this way, the user can preview the image obtained through photographing within a short time after the photographing by using the electronic device.

Optionally, in the embodiments of this application, if the electronic device receives an input by the user previewing the image obtained through photographing after generating the second image, the electronic device directly displays the second image without displaying the first image.

For example, after step 202, the photographing method provided in this embodiment of this application may further include the following step 204, as shown in FIG. 10.

Step 204. In a case of receiving a third input by the user after the second time, the photographing apparatus displays the second image in response to the third input.

For example, the third input functions as same as the second input, both of which are an input by the user previewing the second image. The difference lies in that a time of the second input is before the second time and a time of the third input is after the second time.

For example, after generating the second image, if the photographing apparatus receives a third input by the user previewing the second image at this time, the second image is directly displayed to the user without displaying the first image. After generating the second image, to reduce the storage space occupied by useless images, the photographing apparatus replaces the first image with the second image and deletes the first image. In this case, only the second image is stored in the electronic device.

In this way, after the electronic device generates the second image, the user can directly view the image obtained through photographing.

Optionally, in the embodiments of this application, after the electronic device displays the first image and before the electronic device generates the second image, if the user wants to view the detail of a region in the first image, the electronic device first generates an image of the corresponding region in the second image and displays the generated image of the region to the user.

For example, in step 202, after displaying the first image and before displaying the second image, the photographing method provided in this embodiment of this application may further include the following steps 205a1 to 205a3, as shown in FIG. 11.

Step 205a1. The photographing apparatus determines a target region in response to a fourth input by the user on the first image.

Step 205a2. The photographing apparatus generates a first target sub-image based on the target region.

Step 205a3. The photographing apparatus generates and displays a third image based on the first image and the first target sub-image.

The first target sub-image is an image of a partial region in the second image.

It may be understood that the third image may be understood as that an image of the target region in the target region is replaced, based on the first image, with the first target sub-image for display.

For example, the fourth input may be an input by the user previewing the detail of the target region of the first image. For example, the fourth input may be a zooming in input by the user on a region 41 in an interface of the first image displayed by the electronic device shown in FIG. 4.

For example, after the photographing apparatus receives the fourth input by the user on the first image and determines the target region, if an image of a second region, in the current second image, corresponding to a position of the image of the target region has not been generated or has not been completely generated, the photographing apparatus first generates the first target sub-image of the second region and then displays the first target sub-image of the second region to the user. For example, as the fourth input is a zooming in input on the target region, when displaying the image of the second region, the photographing apparatus magnifies the image of the second region by the same magnification as that of the image of the target region for display.

Figure 4:
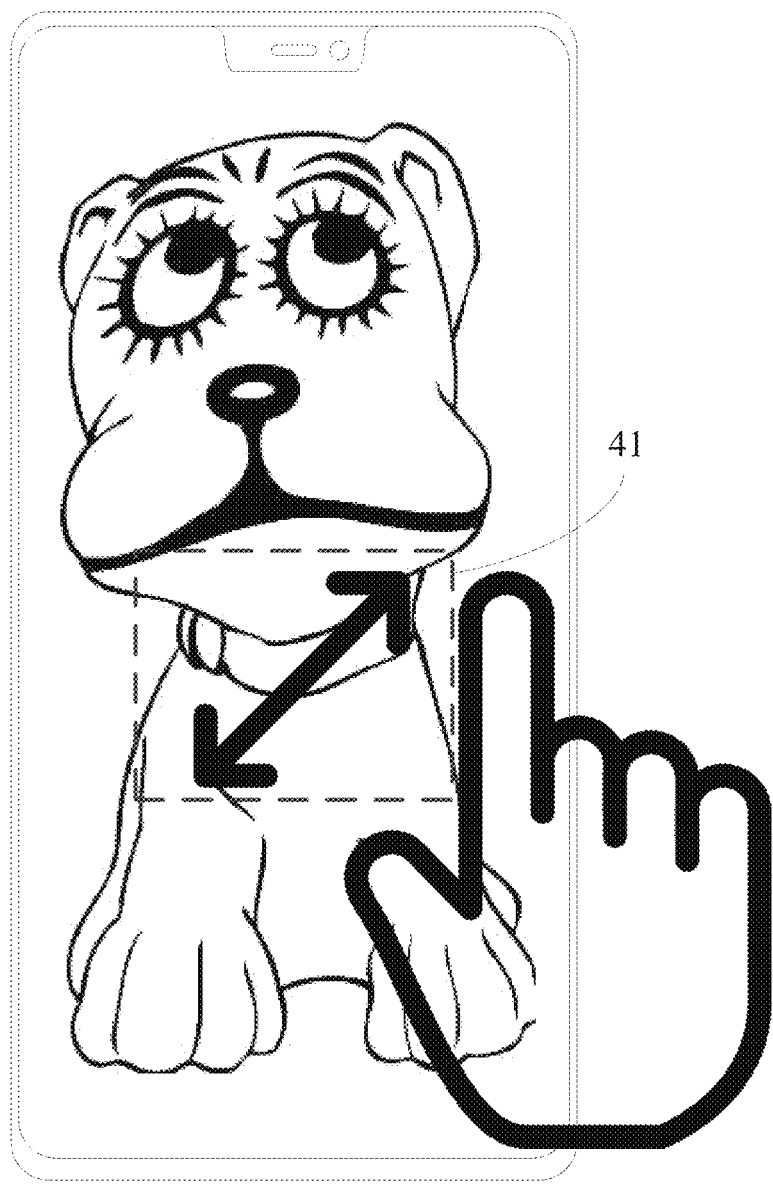
FIG. 4 is a schematic diagram 3 of an interface to which a photographing method is applied according to an embodiment of this application.
Figure 5:
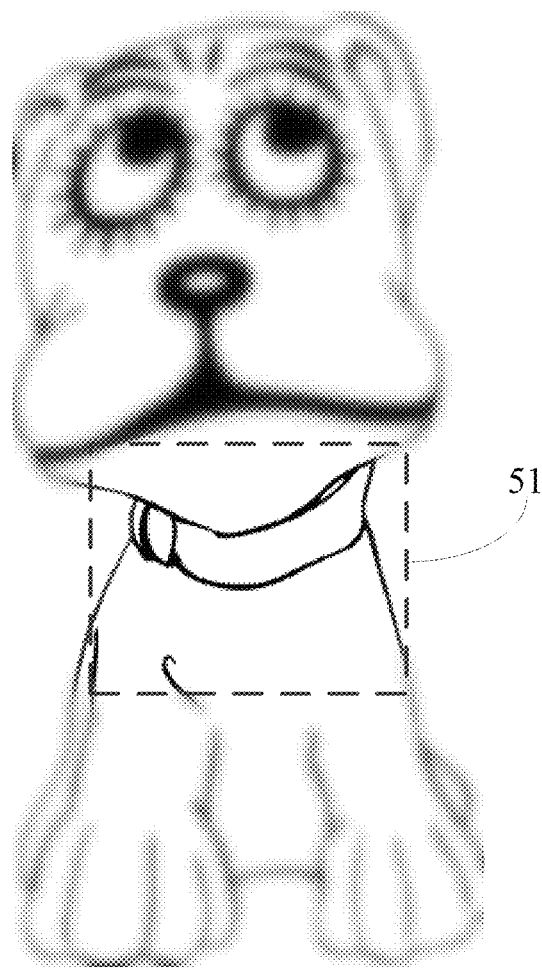
FIG. 5 is a schematic diagram 4 of an interface to which a photographing method is applied according to an embodiment of this application.

For example, FIG. 4 shows an interface of the first image displayed by the electronic device. After the electronic device receives the zooming in input (namely, the fourth input) by the user on the region 41 (namely, the target region), the electronic device first processes an image of a region, in the second image, having the same position as the image of the region 41. As shown in FIG. 5, a region 51 of the second image is the second region having the same position as the region 41 of the first image in FIG. 4. An image in the region 51 has been processed first, and images of other blurred regions have not been processed. After the electronic device receives the zooming in input by the user on the region 41, for the user to view the detail of the region 41, the electronic device first generates the image of the region 51 in the second image and displays the image to the user.

In this way, the electronic device can first generate an image region with an image detail to be viewed by the user when generating the second image.

Optionally, in the embodiments of this application, the fourth input by the user is usually performed on a foreground region of a picture taken by the user. To facilitate the user to preview a high-resolution image of this region before the second image is generated, the electronic device may first generate the image of the region.

Figures 7, 8:
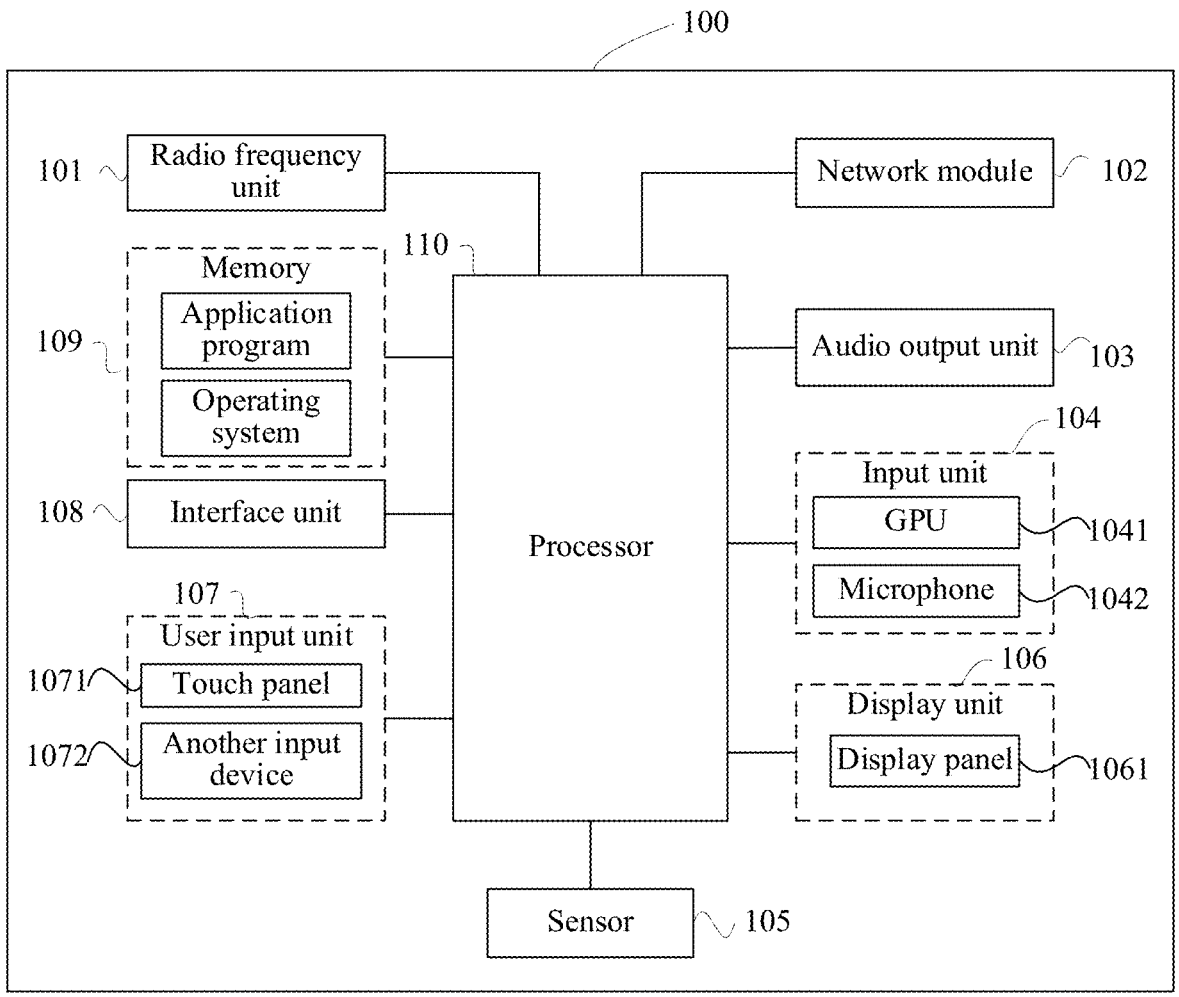
FIG. 7 is a schematic diagram of a structure of an electronic device according to an embodiment of this application.
FIG. 8 is a schematic flowchart 2 of a photographing method according to an embodiment of this application.

For example, in step 202, the generating a second image within a period from the time when receiving the photographing input to a second time may include the following step 202a, as shown in FIG. 8.

Step 202a. The photographing apparatus generates an image of a foreground region of the second image within the second time, and generates an image of a background region of the second image after the image of the foreground region is generated.

The background region is a region other than the foreground region in the second image.

For example, the foreground region may be a photographing body to be photographed by the user. Usually, the photographing body is located in the foreground region. The photographing apparatus may determine the photographing body based on a photographing focus of the electronic device, or may recognize and analyze key information to which the user pays attention from the taken photo through deep learning, and first process the information, so that the user can quickly preview key parts in the photo.

For example, after step 202a, if the photographing apparatus receives a fifth input by the user on a foreground region in the first image, the photographing apparatus directly displays the image of the foreground region in the second image in response to the fifth input by the user, that is, replaces an image of the foreground region in the first image with the image of the foreground region in the second image.

For example, the fifth input functions as same as the fourth input, that is, the fifth input is a zooming in input by the user on the foreground region of the first image. For example, the fifth input may be a zooming in input by the user on a third region in the foreground region of the first image. The third region is part or all of the foreground region of the first image.

In this way, when the user views the detail of the image of the foreground region in the first image, the electronic device can directly display the generated image of the foreground region to the user, reducing a waiting time of the user.

Optionally, in the embodiments of this application, the second image generated by the electronic device may directly replace the first image currently displayed.

For example, step 203 may include the following step 203a, as shown in FIG. 9.

Step 203a. The photographing apparatus replaces the displayed first image with the second image after the second time.

For example, after the photographing apparatus generates the second image, if the electronic device is displaying the first image at this time, the photographing apparatus may change the displayed image from the first image to the second image. For example, the photographing apparatus may replace the first image with the second image by cutting out, fading out, pushing in, wiping off, splitting, or other transition methods.

In this way, in the foregoing display manners, after generating the second image, the electronic device may replace the low-resolution first image that is being displayed with the high-resolution second image when the user views the first image, for viewing by the user.

In the photographing method provided in the embodiments of this application, after receiving a photographing input by a user on a target object, an electronic device generates a first image with a lower resolution within a period from a time when receiving the photographing input to a first time and generates a second image with a higher resolution within a period from the time when receiving the photographing input to a second time. Then, if receiving a second input by the user before the second time, the electronic device first displays the first image with the lower resolution to the user, and then displays the second image to the user after the second time. If a third input by the user is received after the second time, the second image is directly displayed to the user. In this way, the user can preview the image obtained through photographing within a short time after the photographing by using the electronic device.

It is to be noted that, the photographing method provided in the embodiments of this application may be performed by a photographing apparatus or a control module in the photographing apparatus for performing the photographing method. In an embodiment of this application, a photographing apparatus performing the photographing method is used as an example to describe the photographing apparatus provided in the embodiments of this application.

It is to be noted that, in the embodiments of this application, each photographing method shown in the foregoing method accompanying drawings is exemplarily described with reference to one accompanying drawing in the embodiments of this application. During specific implementation, each photographing method shown in the foregoing method accompanying drawings may be further implemented with reference to any other combinable accompanying drawings schematically described in the foregoing embodiments, and details are not described herein again.

Figure 6:
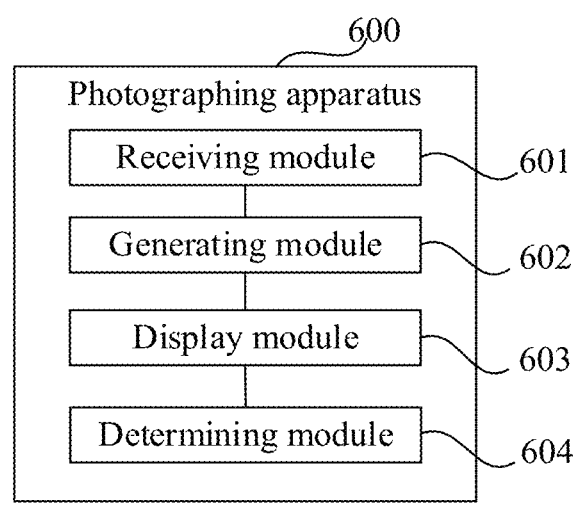
FIG. 6 is a schematic diagram of a structure of a photographing apparatus according to an embodiment of this application.

FIG. 6 is a schematic diagram of a hardware structure of a photographing apparatus according to an embodiment of this application. As shown in FIG. 6, the photographing apparatus 600 includes: a receiving module 601, a generating module 602, and a display module 603. The receiving module 601 is configured to receive a photographing input on a target object. The generating module 602 is configured to: in response to the photographing input received by the receiving module 601, generate a first image within a period from a time when receiving the photographing input to a first time and generate a second image within a period from the time when receiving the photographing input to a second time. The display module 603 is configured to: display the first image in response to a second input by a user received by the receiving module 601 before the second time, and display the second image after the second time. Pixels of the first image are fewer than pixels of the second image; and the second time is greater than the first time.

Optionally, the display module 603 is further configured to display the second image in response to a third input received by the receiving module 601 after the second time.

Optionally, the photographing apparatus 600 further includes: a determining module 604. The determining module 604 is configured to determine a target region in response to a fourth input, received by the receiving module 601, by the user on the first image. The generating module 602 is further configured to generate a first target sub-image based on the target region determined by the determining module 604. The generating module 602 is further configured to generate and display a third image based on the first image and the first target sub-image. The first target sub-image is an image of a partial region in the second image.

Optionally, the generating module 602 is further configured to: generate an image of a foreground region of the second image within the second time, and generate an image of a background region of the second image after the image of the foreground region is generated.

Optionally, the display module 603 is further configured to replace the displayed first image with the second image after the second time.

In the embodiments of this application, the photographing apparatus may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a handheld computer, an in-vehicle electronic device, a wearable device, an ultra-mobile personal computer (UMPC), a netbook, a personal digital assistant (PDA), or the like; and the non-mobile electronic device may be a server, a network attached storage (NAS), a personal computer (PC), a television (TV), a teller machine, a self-service machine, or the like. This is not specifically limited in the embodiments of this application.

The photographing apparatus in the embodiments of this application may be an apparatus with an operating system. The operating system may be an Android operating system, may be an iOS operating system, or may be another possible operating system. This is not specifically limited in the embodiments of this application.

The photographing apparatus provided in the embodiments of this application can implement all processes performed by the photographing apparatus in the method embodiments in FIG. 1 to FIG. 5. To avoid repetition, details are not described herein again.

By using the photographing apparatus provided in the embodiments of this application, after receiving a photographing input by a user on a target object, an electronic device generates a first image with a lower resolution within a period from a time when receiving the photographing input to a first time and generates a second image with a higher resolution within a period from the time when receiving the photographing input to a second time. Then, if receiving a second input by the user before the second time, the electronic device first displays the first image with the lower resolution to the user, and then displays the second image to the user after the second time. If a third input by the user is received after the second time, the second image is directly displayed to the user. In this way, the user can preview the image obtained through photographing within a short time after the photographing by using the electronic device.

Optionally, an embodiment of this application further provides an electronic device, including a processor 110, a memory 109, and a program or instructions that are stored in the memory 109 and executable on the processor 110. The program or instructions, when executed by the processor 110, implement the processes of the embodiments of the photographing method, and can achieve the same technical effects. To avoid repetition, details are not described herein again.

It is to be noted that the electronic device in the embodiments of this application includes the mobile electronic device and the non-mobile electronic device.

FIG. 7 is a schematic diagram of a hardware structure of an electronic device for implementing the embodiments of this application.

The electronic device 100 includes, but is not limited to: components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the electronic device 100 may also include a power supply (such as a battery) for supplying power to the components. The power supply may be logically connected to the processor 110 by a power management system, thereby achieving such functions as charging, discharging, and power consumption management by using the power management system. The structure of the electronic device shown in FIG. 7 constitutes no limitation on the electronic device, and the electronic device may include more or fewer components than those shown in the figure, or some components may be combined, or a different component deployment may be used. Details are not described herein.

The user input unit 107 is further configured to receive a photographing input by a user on a target image. The processor 110 is configured to: in response to the photographing input received by the user input unit 107, generate a first image within a period from a time when receiving the photographing input to a first time and generate a second image within a period from the time when receiving the photographing input to a second time. The display unit 106 is configured to: display the first image in response to a second input by a user received by the user input unit 107 before the second time, and display the second image after the second time. Pixels of the first image are fewer than pixels of the second image; and the second time is greater than the first time.

In this case, after receiving the photographing input by the user on the target image, the electronic device generates the first image with a lower resolution and the second image with a higher resolution. Then, if the second input by the user is received before the second image is generated, the first image is displayed to the user first, and then the second image is displayed to the user after the second image is generated. In this way, the user can preview the image obtained through photographing within a short time after the photographing by using the electronic device.

Optionally, the display unit 106 is further configured to display the second image in response to a third input received by the user input unit 107 after the second time.

In this way, after the electronic device generates the second image, the user can directly view the image obtained through photographing.

Optionally, the processor 110 is configured to determine a target region in response to a fourth input, received by the user input unit 107, by the user on the first image; the processor 110 is further configured to generate a first target sub-image based on the target region; the processor 110 is further configured to generate a third image based on the first image and the first target sub-image; and the display unit 106 is further configured to display the third image. The first target sub-image is an image of a partial region in the second image.

In this way, the electronic device can first generate an image region with an image detail to be viewed by the user when generating the second image.

Optionally, the processor 110 is further configured to: generate an image of a foreground region of the second image within the second time, and generate an image of a background region of the second image after the image of the foreground region is generated.

In this way, when the user views the detail of the image of the foreground region in the first image, the electronic device can directly display the generated image of the foreground region to the user, reducing a time for the user to wait for generation.

Optionally, the display unit 106 is further configured to replace the displayed first image with the second image after the second time.

In this way, in the foregoing display manners, after generating the second image, the electronic device may replace the low-resolution first image that is being displayed with the high-resolution second image when the user views the first image, for viewing by the user.

By using the electronic device provided in the embodiments of this application, after receiving a photographing input by a user on a target object, the electronic device generates a first image with a lower resolution within a period from a time when receiving the photographing input to a first time and generates a second image with a higher resolution within a period from the time when receiving the photographing input to a second time. Then, if receiving a second input by the user before the second time, the electronic device first displays the first image with the lower resolution to the user, and then displays the second image to the user after the second time. If a third input by the user is received after the second time, the second image is directly displayed to the user. In this way, the user can preview the image obtained through photographing within a short time after the photographing by using the electronic device.

It should be understood that in the embodiments of this application, the input unit 104 may include a graphics processing unit (GPU) 1041 and a microphone 1042. The graphics processing unit 1041 processes image data of a static picture or a video that is obtained by an image capture apparatus (for example, a camera) in a video capture mode or an image capture mode. The display unit 106 may include a display panel 1061. The display panel 1061 may be configured in a form of a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include, but is not limited to, a physical keyboard, a functional key (such as a volume control key or a switch key), a track ball, a mouse, and a joystick. Details are not described herein. The memory 109 may be configured to store a software program and various data, including but not limited to an application program and an operating system. The processor 110 may integrate an application processor and a modem processor, where the application processor mainly processes an operating system, a user interface, an application program, and the like, and the modem processor mainly processes wireless communication. It may be understood that the foregoing modem processor may either not be integrated into the processor 110.

An embodiment of this application further provides a non-transitory readable storage medium, storing a program or instructions. The program or instructions, when executed by a processor, implement the processes of the embodiments of the photographing method, and can achieve the same technical effects. To avoid repetition, details are not described herein again.

The processor is a processor in the electronic device in the above embodiments. The non-transitory readable storage medium includes a non-transitory computer-readable storage medium, such as a computer read-only memory (ROM), a random access memory (RAM), a magnetic disk, or an optical disc.

An embodiment of this application provides a chip, including a processor and a communication interface. The communication interface is coupled to the processor. The processor is configured to execute a program or instructions to implement the processes of the embodiments of the photographing method, and can achieve the same technical effects. To avoid repetition, details are not described herein again.

It should be understood that, the chip mentioned in the embodiments of this application may also be referred to as a system-level chip, a system chip, a chip system, a system on chip, or the like.

Optionally, an embodiment of this application further provides a computer program product, stored in a non-volatile storage medium, and configured to be executed by at least one processor to implement steps of the method above.

Optionally, an embodiment of this application further provides a control apparatus, configured to perform the method above.

It is to be noted that, the terms "include", "comprise", or any other variation thereof in this specification is intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses. In addition, it is to be noted that the scopes of the method and apparatus in the implementations of this application are not limited to implementing functions in an order shown or discussed, and may further include implementing functions in a substantially simultaneous manner or in a reverse order according to the functions involved. For example, the described method may be performed in an order different from that described, and various steps may also be added, omitted, or combined. Moreover, features described according to some examples may also be combined in other examples.

Through the descriptions of the above implementations, a person skilled in the art may clearly understand that the method according to the above embodiments may be implemented by using software and a necessary general hardware platform, and certainly, may alternatively be implemented by hardware, but in many cases, the former manner is a better implementation. Based on such an understanding, the technical solutions of this application essentially or the part contributing to the existing technologies may be implemented in the form of a software product. The computer software product is stored in a storage medium (such as a ROM/RAM, a magnetic disk, or an optical disc), and includes several instructions to enable an electronic device (which may be a mobile phone, a computer, a server, an air conditioner, a network device, or the like) to perform the method described in the embodiments of this application.

The embodiments of this application have been described above with reference to the accompanying drawings. This application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall fall within the protection scope of this application.

What is claimed is:

1. A photographing method, comprising:
   receiving a photographing input on a target object;
   in response to the photographing input, generating a first image within a period from a time when receiving the photographing input to a first time and generating a second image within a period from the time when receiving the photographing input to a second time; and
   in a case that a second input by a user is received before the second time, displaying the first image in response to the second input, and displaying the second image after the second time, wherein
   pixels of the first image are fewer than pixels of the second image; and the second time is greater than the first time;
   wherein the generating the second image within the period from the time when receiving the photographing input to the second time comprises:
   generating an image of a foreground region of the second image within the second time, and generating an image of a background region of the second image after the image of the foreground region is generated.

2. The method according to claim 1, wherein the displaying the second image after the second time comprises:
   in a case that a third input is received after the second time, displaying the second image in response to the third input.

3. The method according to claim 1, wherein after the step of in a case that a second input by a user is received before the second time, displaying the first image in response to the second input, and before the step of displaying the second image after the second time, the method further comprises:
   determining a target region in response to a fourth input by the user on the first image;
   generating a first target sub-image based on the target region; and generating and displaying a third image based on the first image and the first target sub-image, wherein
the first target sub-image is an image of a partial region in the second image.

4. The method according to claim 1, wherein the displaying the second image after the second time comprises:
replacing the displayed first image with the second image after the second time.

5. An electronic device, comprising a processor, a memory,
and a program or instructions that are stored in the memory and executable on the processor, wherein the program or instructions, when executed by the processor, cause the electronic device to perform:
receiving a photographing input on a target object;
in response to the photographing input, generating a first image within a period from a time when receiving the photographing input to a first time and generating a second image within a period from the time when receiving the photographing input to a second time; and
in a case that a second input by a user is received before the second time, displaying the first image in response to the second input, and displaying the second image after the second time, wherein
pixels of the first image are fewer than pixels of the second image; and the second time is greater than the first time;
wherein the program or instructions, when executed by the processor, cause the electronic device to further perform:
generating an image of a foreground region of the second image within the second time, and generating an image of a background region of the second image after the image of the foreground region is generated.

6. The electronic device according to claim 5, wherein the program or instructions, when executed by the processor, cause the electronic device to further perform:
in a case that a third input is received after the second time, displaying the second image in response to the third input.

7. The electronic device according to claim 5, wherein the program or instructions, when executed by the processor, cause the electronic device to further perform:
determining a target region in response to a fourth input by the user on the first image;
generating a first target sub-image based on the target region; and
generating and displaying a third image based on the first image and the first target sub-image, wherein
the first target sub-image is an image of a partial region in the second image.

8. The electronic device according to claim 5, wherein the program or instructions, when executed by the processor, cause the electronic device to further perform:
replacing the displayed first image with the second image after the second time.

9. A non-transitory readable storage medium, storing a program or instructions, wherein the program or instructions, when executed by a processor, cause an electronic device to perform:
receiving a photographing input on a target object;
in response to the photographing input, generating a first image within a period from a time when receiving the photographing input to a first time and generating a second image within a period from the time when receiving the photographing input to a second time; and
in a case that a second input by a user is received before the second time, displaying the first image in response to the second input, and displaying the second image after the second time, wherein
pixels of the first image are fewer than pixels of the second image; and the second time is greater than the first time;
wherein the program or instructions, when executed by the processor, cause the electronic device to further perform:
generating an image of a foreground region of the second image within the second time, and generating an image of a background region of the second image after the image of the foreground region is generated.

10. The non-transitory readable storage medium according to claim 9, wherein the program or instructions, when executed by the processor, cause the electronic device to further perform:
in a case that a third input is received after the second time, displaying the second image in response to the third input.

11. The non-transitory readable storage medium according to claim 9, wherein the program or instructions, when executed by the processor, cause the electronic device to further perform:
determining a target region in response to a fourth input by the user on the first image;
generating a first target sub-image based on the target region; and
generating and displaying a third image based on the first image and the first target sub-image, wherein
the first target sub-image is an image of a partial region in the second image.

12. The non-transitory readable storage medium according to claim 9, wherein the program or instructions, when executed by the processor, cause the electronic device to further perform:
replacing the displayed first image with the second image after the second time.

* * * * *